US008640032B2

(12) United States Patent
Priyadarshan et al.

(10) Patent No.: US 8,640,032 B2
(45) Date of Patent: Jan. 28, 2014

(54) SELECTION AND DELIVERY OF INVITATIONAL CONTENT BASED ON PREDICTION OF USER INTENT

(75) Inventors: Eswar Priyadarshan, West Roxbury, MA (US); Kenley Sun, Cambridge, MA (US); Dan Marius Grigorovici, Pleasanton, CA (US); Jayasurya Vadrevu, Lexington, MA (US); Omar Abdala, Cambridge, MA (US)

(73) Assignee: Apple Inc., Cupertino, CA (US)

( * ) Notice: Subject to any disclaimer, the term of this patent is extended or adjusted under 35 U.S.C. 154(b) by 662 days.

(21) Appl. No.: 12/873,235

(22) Filed: Aug. 31, 2010

(65) Prior Publication Data

US 2012/0054627 A1    Mar. 1, 2012

(51) Int. Cl.
G06F 3/01       (2006.01)
G06F 15/16      (2006.01)

(52) U.S. Cl.
USPC ............................ 715/736; 715/738

(58) Field of Classification Search
USPC ................................ 715/736, 738
See application file for complete search history.

(56) References Cited

U.S. PATENT DOCUMENTS

| 5,408,519 A | 4/1995 | Pierce et al. |
|---|---|---|
| 5,459,306 A | 10/1995 | Stein et al. |
| 5,600,364 A | 2/1997 | Hendricks et al. |
| 5,613,213 A | 3/1997 | Naddell et al. |
| 5,678,179 A | 10/1997 | Turcotte et al. |
| 5,978,775 A | 11/1999 | Chen |
| 5,978,833 A | 11/1999 | Pashley et al. |
| 6,006,197 A | 12/1999 | d'Eon et al. |
| 6,009,410 A | 12/1999 | LeMole et al. |
| 6,023,700 A | 2/2000 | Owens et al. |
| 6,055,512 A | 4/2000 | Dean et al. |
| 6,055,513 A | 4/2000 | Katz et al. |
| 6,057,872 A | 5/2000 | Candelore |

(Continued)

FOREIGN PATENT DOCUMENTS

| BE | 1015704 | 7/2005 |
|---|---|---|
| DE | 19941461 | 3/2001 |

(Continued)

OTHER PUBLICATIONS

"Specific Media Behavioral Targeting Index," Specific Media, Inc., Irvine, CA, 2010 (Available online at http://www.specificmedia.com/behavioral-targeting.php, last visited Aug. 26, 2010).

(Continued)

*Primary Examiner* — Andrea Leggett
(74) *Attorney, Agent, or Firm* — Novak Druce Connolly Bove + Quigg LLP

(57) ABSTRACT

Systems and methods are provided for delivering invitational content based on a prediction of the intent of a user. In particular, partial action sequences are identified in a journal of events associated with the user. Thereafter, the partial sequences are analyzed and scored based on their degree of proximity to completion. Based on this scoring, a queue of invitational content can then be generated, where the scoring can be used to select and order the invitational content for the user. In some configurations, the information in the journal can be used to determine future time intervals at which sequences will be completed by the user. Consequently, a queue can be adjusted to provide delivery of appropriate invitational content at these future time intervals.

25 Claims, 6 Drawing Sheets

(56) References Cited

U.S. PATENT DOCUMENTS

| | | | |
|---|---|---|---|
| 6,097,942 A | 8/2000 | Laiho | |
| 6,253,189 B1 | 6/2001 | Feezell et al. | |
| 6,286,005 B1 | 9/2001 | Cannon | |
| 6,334,145 B1 | 12/2001 | Adams et al. | |
| 6,338,044 B1 | 1/2002 | Cook et al. | |
| 6,345,279 B1 | 2/2002 | Li et al. | |
| 6,381,465 B1 | 4/2002 | Chern et al. | |
| 6,393,407 B1 * | 5/2002 | Middleton et al. | 705/14.73 |
| 6,405,243 B1 | 6/2002 | Nielsen | |
| 6,408,309 B1 | 6/2002 | Agarwal | |
| 6,446,261 B1 | 9/2002 | Rosser | |
| 6,502,076 B1 | 12/2002 | Smith | |
| 6,684,249 B1 | 1/2004 | Frerichs et al. | |
| 6,690,394 B1 | 2/2004 | Harui | |
| 6,698,020 B1 | 2/2004 | Zigmond et al. | |
| 6,718,551 B1 | 4/2004 | Swix et al. | |
| 6,738,978 B1 | 5/2004 | Hendricks et al. | |
| 6,795,808 B1 | 9/2004 | Strubbe et al. | |
| 6,886,000 B1 | 4/2005 | Aggarwal et al. | |
| 6,920,326 B2 | 7/2005 | Agarwal et al. | |
| 6,990,462 B1 | 1/2006 | Wilcox et al. | |
| 7,072,947 B1 | 7/2006 | Knox et al. | |
| 7,149,537 B1 | 12/2006 | Kupsh et al. | |
| 7,168,084 B1 | 1/2007 | Hendricks et al. | |
| 7,203,684 B2 | 4/2007 | Carobus et al. | |
| 7,356,477 B1 | 4/2008 | Allan et al. | |
| 7,370,002 B2 | 5/2008 | Heckerman et al. | |
| 7,539,652 B2 | 5/2009 | Flinn et al. | |
| 7,558,559 B2 | 7/2009 | Alston | |
| 7,669,212 B2 | 2/2010 | Alao et al. | |
| 7,685,019 B2 | 3/2010 | Collins | |
| 7,730,017 B2 | 6/2010 | Nance et al. | |
| 7,734,632 B2 | 6/2010 | Wang | |
| 7,747,676 B1 | 6/2010 | Nayfeh et al. | |
| 7,870,576 B2 | 1/2011 | Eldering | |
| 7,882,518 B2 | 2/2011 | Finseth et al. | |
| 7,903,099 B2 | 3/2011 | Baluja | |
| 7,912,843 B2 | 3/2011 | Murdock et al. | |
| 7,984,014 B2 | 7/2011 | Song et al. | |
| 8,046,797 B2 | 10/2011 | Bentolila et al. | |
| 8,060,406 B2 | 11/2011 | Blegen | |
| 8,191,098 B2 | 5/2012 | Cooper et al. | |
| 8,196,166 B2 | 6/2012 | Roberts | |
| 8,229,786 B2 | 7/2012 | Cetin et al. | |
| 8,380,562 B2 | 2/2013 | Toebes et al. | |
| 2001/0044739 A1 | 11/2001 | Bensemana | |
| 2001/0047272 A1 | 11/2001 | Frietas et al. | |
| 2001/0051925 A1 | 12/2001 | Kang | |
| 2002/0006803 A1 | 1/2002 | Mendiola et al. | |
| 2002/0016736 A1 | 2/2002 | Cannon et al. | |
| 2002/0019829 A1 | 2/2002 | Shapiro | |
| 2002/0021809 A1 | 2/2002 | Salo et al. | |
| 2002/0052781 A1 | 5/2002 | Aufricht et al. | |
| 2002/0075305 A1 | 6/2002 | Beaton et al. | |
| 2002/0077130 A1 | 6/2002 | Owensby | |
| 2002/0078147 A1 | 6/2002 | Bouthors et al. | |
| 2002/0083411 A1 | 6/2002 | Bouthers et al. | |
| 2002/0099842 A1 | 7/2002 | Jennings et al. | |
| 2002/0120498 A1 | 8/2002 | Gordon et al. | |
| 2002/0137507 A1 | 9/2002 | Winkler | |
| 2002/0138291 A1 | 9/2002 | Vaidyanathan et al. | |
| 2002/0161770 A1 | 10/2002 | Shapiro et al. | |
| 2002/0164977 A1 | 11/2002 | Link, II et al. | |
| 2002/0165773 A1 | 11/2002 | Natsumo et al. | |
| 2002/0175935 A1 | 11/2002 | Wang et al. | |
| 2003/0003935 A1 | 1/2003 | Vesikivi et al. | |
| 2003/0040297 A1 | 2/2003 | Pecen et al. | |
| 2003/0083931 A1 | 5/2003 | Lang | |
| 2003/0101454 A1 | 5/2003 | Ozer et al. | |
| 2003/0126015 A1 | 7/2003 | Chan et al. | |
| 2003/0126146 A1 | 7/2003 | Van Der Riet | |
| 2003/0130887 A1 | 7/2003 | Nathaniel | |
| 2003/0154300 A1 | 8/2003 | Mostafa | |
| 2003/0182567 A1 | 9/2003 | Barton et al. | |
| 2003/0188017 A1 | 10/2003 | Nomura | |
| 2003/0191689 A1 | 10/2003 | Bosarge et al. | |
| 2003/0197719 A1 | 10/2003 | Lincke et al. | |
| 2004/0003398 A1 | 1/2004 | Donian et al. | |
| 2004/0043777 A1 | 3/2004 | Brouwer et al. | |
| 2004/0045029 A1 | 3/2004 | Matsuura | |
| 2004/0054576 A1 | 3/2004 | Kanerva et al. | |
| 2004/0068435 A1 | 4/2004 | Braunzell | |
| 2004/0133480 A1 | 7/2004 | Domes | |
| 2004/0136358 A1 | 7/2004 | Hind et al. | |
| 2004/0158858 A1 | 8/2004 | Paxton et al. | |
| 2004/0185883 A1 | 9/2004 | Rukman | |
| 2004/0192359 A1 | 9/2004 | McRaild et al. | |
| 2004/0203761 A1 | 10/2004 | Baba et al. | |
| 2004/0203851 A1 | 10/2004 | Vetro et al. | |
| 2004/0204133 A1 | 10/2004 | Andrew et al. | |
| 2004/0209649 A1 | 10/2004 | Lord | |
| 2004/0259526 A1 | 12/2004 | Goris et al. | |
| 2005/0010641 A1 | 1/2005 | Staack | |
| 2005/0021397 A1 | 1/2005 | Cui et al. | |
| 2005/0060425 A1 | 3/2005 | Yeh et al. | |
| 2005/0075929 A1 | 4/2005 | Wolinsky et al. | |
| 2005/0125397 A1 | 6/2005 | Gross et al. | |
| 2005/0138140 A1 | 6/2005 | Wen et al. | |
| 2005/0228680 A1 | 10/2005 | Malik | |
| 2005/0228797 A1 | 10/2005 | Koningstein et al. | |
| 2005/0229209 A1 | 10/2005 | Hildebolt et al. | |
| 2005/0239495 A1 | 10/2005 | Bayne | |
| 2005/0239504 A1 | 10/2005 | Ishii et al. | |
| 2005/0249216 A1 | 11/2005 | Jones | |
| 2005/0267798 A1 | 12/2005 | Panara | |
| 2005/0273465 A1 | 12/2005 | Kimura | |
| 2005/0273833 A1 | 12/2005 | Soinio | |
| 2005/0289113 A1 | 12/2005 | Bookstaff | |
| 2006/0031327 A1 | 2/2006 | Kredo | |
| 2006/0040642 A1 | 2/2006 | Boris et al. | |
| 2006/0048059 A1 | 3/2006 | Etkin | |
| 2006/0059133 A1 | 3/2006 | Moritani | |
| 2006/0068845 A1 | 3/2006 | Muller et al. | |
| 2006/0075425 A1 | 4/2006 | Koch et al. | |
| 2006/0095511 A1 | 5/2006 | Munarriz et al. | |
| 2006/0117378 A1 | 6/2006 | Tam et al. | |
| 2006/0123014 A1 | 6/2006 | Ng | |
| 2006/0129455 A1 | 6/2006 | Shah | |
| 2006/0141923 A1 | 6/2006 | Goss | |
| 2006/0161520 A1 | 7/2006 | Brewer et al. | |
| 2006/0167747 A1 | 7/2006 | Goodman et al. | |
| 2006/0168616 A1 | 7/2006 | Candelore | |
| 2006/0194595 A1 | 8/2006 | Myllynen et al. | |
| 2006/0200460 A1 | 9/2006 | Meyerzon et al. | |
| 2006/0200461 A1 | 9/2006 | Lucas et al. | |
| 2006/0206586 A1 | 9/2006 | Ling et al. | |
| 2006/0276170 A1 | 12/2006 | Radhakrishnan et al. | |
| 2006/0276213 A1 | 12/2006 | Gottschalk et al. | |
| 2006/0282319 A1 | 12/2006 | Maggio | |
| 2006/0286963 A1 | 12/2006 | Koskinen et al. | |
| 2006/0286964 A1 | 12/2006 | Polanski et al. | |
| 2006/0288124 A1 | 12/2006 | Kraft et al. | |
| 2007/0004333 A1 | 1/2007 | Kavanti | |
| 2007/0011344 A1 | 1/2007 | Paka et al. | |
| 2007/0016743 A1 | 1/2007 | Jevans | |
| 2007/0022021 A1 | 1/2007 | Walker et al. | |
| 2007/0027703 A1 | 2/2007 | Hu et al. | |
| 2007/0037562 A1 | 2/2007 | Smith-Kerker et al. | |
| 2007/0047523 A1 | 3/2007 | Jiang | |
| 2007/0061195 A1 | 3/2007 | Liu et al. | |
| 2007/0061300 A1 | 3/2007 | Ramer et al. | |
| 2007/0072631 A1 | 3/2007 | Mock et al. | |
| 2007/0074262 A1 | 3/2007 | Kikkoji et al. | |
| 2007/0083602 A1 | 4/2007 | Heggenhougen et al. | |
| 2007/0088687 A1 | 4/2007 | Bromm et al. | |
| 2007/0088851 A1 | 4/2007 | Levkovitz et al. | |
| 2007/0094066 A1 | 4/2007 | Kumar et al. | |
| 2007/0100651 A1 | 5/2007 | Ramer et al. | |
| 2007/0100805 A1 | 5/2007 | Ramer et al. | |
| 2007/0105536 A1 | 5/2007 | Tingo, Jr. | |
| 2007/0113243 A1 | 5/2007 | Brey | |
| 2007/0117571 A1 | 5/2007 | Musial | |
| 2007/0118592 A1 | 5/2007 | Bachenberg | |
| 2007/0136457 A1 | 6/2007 | Dai et al. | |

(56) References Cited

U.S. PATENT DOCUMENTS

| | | | |
|---|---|---|---|
| 2007/0149208 A1 | 6/2007 | Syrbe et al. | |
| 2007/0156534 A1 | 7/2007 | Lerner et al. | |
| 2007/0180147 A1 | 8/2007 | Leigh | |
| 2007/0192409 A1 | 8/2007 | Kleinstern et al. | |
| 2007/0198485 A1 | 8/2007 | Ramer et al. | |
| 2007/0214470 A1 | 9/2007 | Glasgow et al. | |
| 2007/0233671 A1 | 10/2007 | Oztekin et al. | |
| 2007/0244750 A1 | 10/2007 | Grannan et al. | |
| 2007/0260624 A1* | 11/2007 | Chung et al. | 707/101 |
| 2007/0288950 A1 | 12/2007 | Downey et al. | |
| 2007/0290787 A1 | 12/2007 | Fiatal et al. | |
| 2007/0300263 A1 | 12/2007 | Barton et al. | |
| 2008/0004046 A1 | 1/2008 | Mumick et al. | |
| 2008/0013537 A1 | 1/2008 | Dewey et al. | |
| 2008/0032703 A1 | 2/2008 | Krumm et al. | |
| 2008/0032717 A1 | 2/2008 | Sawada et al. | |
| 2008/0052158 A1 | 2/2008 | Ferro et al. | |
| 2008/0070579 A1 | 3/2008 | Kankar et al. | |
| 2008/0071875 A1 | 3/2008 | Koff et al. | |
| 2008/0071929 A1 | 3/2008 | Motte et al. | |
| 2008/0082686 A1 | 4/2008 | Schmidt et al. | |
| 2008/0133344 A1 | 6/2008 | Hyder et al. | |
| 2008/0228568 A1 | 9/2008 | Williams et al. | |
| 2008/0243619 A1 | 10/2008 | Sharman et al. | |
| 2008/0262927 A1 | 10/2008 | Kanayama et al. | |
| 2008/0281606 A1 | 11/2008 | Kitts et al. | |
| 2008/0288476 A1 | 11/2008 | Kim et al. | |
| 2009/0006194 A1 | 1/2009 | Sridharan et al. | |
| 2009/0029721 A1 | 1/2009 | Doraswamy | |
| 2009/0049090 A1 | 2/2009 | Shenfield et al. | |
| 2009/0138304 A1 | 5/2009 | Aharoni et al. | |
| 2009/0197619 A1 | 8/2009 | Colligan et al. | |
| 2009/0240677 A1 | 9/2009 | Parekh et al. | |
| 2009/0275315 A1 | 11/2009 | Alston | |
| 2009/0286520 A1 | 11/2009 | Nielsen et al. | |
| 2009/0298483 A1 | 12/2009 | Bratu et al. | |
| 2010/0030647 A1 | 2/2010 | Shahshahani | |
| 2010/0082397 A1 | 4/2010 | Blegen | |
| 2010/0114654 A1 | 5/2010 | Lukose et al. | |
| 2010/0125505 A1 | 5/2010 | Puttaswamy | |
| 2010/0138271 A1 | 6/2010 | Henkin et al. | |
| 2010/0153216 A1 | 6/2010 | Liang et al. | |
| 2010/0161424 A1 | 6/2010 | Sylvain | |
| 2010/0169176 A1 | 7/2010 | Turakhia | |
| 2011/0106840 A1 | 5/2011 | Barrett et al. | |
| 2011/0209067 A1 | 8/2011 | Bogess et al. | |
| 2011/0276401 A1 | 11/2011 | Knowles et al. | |

FOREIGN PATENT DOCUMENTS

| | | |
|---|---|---|
| DE | 10061984 | 6/2002 |
| EP | 1061465 | 12/2000 |
| EP | 1073293 | 1/2001 |
| EP | 1107137 | 6/2001 |
| EP | 1109371 | 6/2001 |
| EP | 1220132 | 7/2002 |
| EP | 1239392 | 9/2002 |
| EP | 1280087 | 1/2003 |
| EP | 1365604 | 11/2003 |
| EP | 1408705 | 4/2004 |
| EP | 1455511 | 9/2004 |
| EP | 1509024 | 2/2005 |
| EP | 1528827 | 5/2005 |
| EP | 1542482 | 6/2005 |
| EP | 1587332 | 10/2005 |
| EP | 1615455 | 1/2006 |
| EP | 1633100 | 3/2006 |
| EP | 1677475 | 7/2006 |
| EP | 1772822 | 4/2007 |
| GB | 2343051 | 4/2000 |
| GB | 2369218 | 5/2002 |
| GB | 2372867 | 9/2002 |
| GB | 2406996 | 4/2005 |
| GB | 2414621 | 11/2005 |
| GB | 2424546 | 9/2006 |
| JP | 2002/140272 | 5/2002 |
| JP | 2007087138 | 4/2007 |
| JP | 2007199821 | 8/2007 |
| KR | 20060011760 | 7/2004 |
| WO | 96/24213 | 8/1996 |
| WO | 98/21713 | 5/1998 |
| WO | 00/00916 | 1/2000 |
| WO | 00/30002 | 5/2000 |
| WO | 00/44151 | 7/2000 |
| WO | 01/22748 | 3/2001 |
| WO | 01/31497 | 5/2001 |
| WO | 01/44977 | 6/2001 |
| WO | 01/52161 | 7/2001 |
| WO | 01/57705 | 8/2001 |
| WO | 01/58178 | 8/2001 |
| WO | 01/63423 | 8/2001 |
| WO | 01/65411 | 9/2001 |
| WO | 01/69406 | 9/2001 |
| WO | 01/71949 | 9/2001 |
| WO | 01/72063 | 9/2001 |
| WO | 01/91400 | 11/2001 |
| WO | 01/93551 | 12/2001 |
| WO | 01/97539 | 12/2001 |
| WO | 02/09431 | 1/2002 |
| WO | 02/31624 | 4/2002 |
| WO | 02/44989 | 6/2002 |
| WO | 02/054803 | 7/2002 |
| WO | 02/069585 | 9/2002 |
| WO | 02/069651 | 9/2002 |
| WO | 02/075574 | 9/2002 |
| WO | 02/084895 | 10/2002 |
| WO | 02/086664 | 10/2002 |
| WO | 02/096056 | 11/2002 |
| WO | 03/015430 | 2/2003 |
| WO | 03/019845 | 3/2003 |
| WO | 03/024136 | 3/2003 |
| WO | 03/049461 | 6/2003 |
| WO | 03/088690 | 10/2003 |
| WO | 2004/084532 | 9/2004 |
| WO | 2004/086791 | 10/2004 |
| WO | 2004/100470 | 11/2004 |
| WO | 2004/100521 | 11/2004 |
| WO | 2004/102993 | 11/2004 |
| WO | 2004/104867 | 12/2004 |
| WO | 2005/020578 | 3/2005 |
| WO | 2005/029769 | 3/2005 |
| WO | 2005/073863 | 8/2005 |
| WO | 2005/076650 | 8/2005 |
| WO | 2006/002869 | 1/2006 |
| WO | 2006/005001 | 1/2006 |
| WO | 2006/016189 | 2/2006 |
| WO | 2006/024003 | 3/2006 |
| WO | 2006/027407 | 3/2006 |
| WO | 2006/040749 | 4/2006 |
| WO | 2006/093284 | 9/2006 |
| WO | 2006/119481 | 11/2006 |
| WO | 2007/001118 | 1/2007 |
| WO | 2007/002025 | 1/2007 |
| WO | 2007/060451 | 5/2007 |
| WO | 2007/091089 | 8/2007 |
| WO | 2007/103263 | 9/2007 |
| WO | 2008/013437 | 1/2008 |
| WO | 2008/024852 | 2/2008 |
| WO | 2008/045867 | 4/2008 |
| WO | 2008/147919 | 12/2008 |
| WO | 2009/032856 | 3/2009 |
| WO | 2009/077888 | 6/2009 |
| WO | 2009/099876 | 8/2009 |
| WO | 2009/099876 A2 | 8/2009 |
| WO | 2009/158097 | 12/2009 |

OTHER PUBLICATIONS

"Advertisement System, Method and Computer Program Product", IP.com Prior Art Database Disclosure, Pub No. IPCOM000138557D, dated Jul. 24, 2006, IP.com, Amherst, NY (Available online at http://priorartdatabase.com/IPCOM/000138557, last visited Aug. 30, 2010)., Jul. 24, 2006.

(56) References Cited

OTHER PUBLICATIONS

Langheinrich, Marc et al., "Unintrusive Customization Techniques for Web Advertising", Computer Networks: The International Journal of Computer and Telecommunications Networking, vol. 31, No. 11, May 1999, pp. 1259-1272, Elsevier North-Holland, Inc., New York, NY, 1999., May 11, 1999, 1259-1272.
Shaikh, Baber M. et al., "Customized User Segments for Ad Targeting", IP.com Prior Art Database Disclosure, Pub No. IPCOM000185640D, dated Jul. 29, 2009 UTC, IP.com, Amherst, NY (Available online at http://priorartdatabase.com/IPCOM/000185640, last visited Aug. 30, 2010)., Jul. 29, 2009.
"AdWords Reference Guide", Google, 2004.
"Combined Search and Examination Report", for United Kingdom Patent Application No. GB 0816228.1 dated Jan. 2009, Jan. 6, 2009.
"Combined Search and Examination Report dated Mar. 7, 2008", for United Kingdom Patent Application No. GB 0721863.9, Mar. 7, 2008.
"Communication (Combined Search and Examination Report under Sections 17 and 18(3)) dated Jan. 30, 2009 issued from the United Kingdom Patent Office", in related United Kingdom Application No. GB 0818145.5 (8 pages), Jan. 30, 2009.
"Communication (European Search Report) dated Jun. 26, 2008", in European Patent Application No. EP 08101394, Jun. 26, 2008.
"Communication (European Search Report) dated Oct. 17, 2008 issued by the European Patent Office", in counterpart European Patent Application EP 08156763, Oct. 17, 2008.
"Communication (International Search Report along with Written Opinion of International Searching Authority) mailed Oct. 8, 2008 issued by the International Searching Authority", in counterpart International Application PCT/EP 2008/056342, Oct. 8, 2008.
"Communication (Notification Concerning Transmittal of International Preliminary Report on Patentability, International Preliminary Report on Patentability, and Written Opinion of the International Searching Authority)", issued in connection with related International Application PCT/EP 2008/051489 and mailed on Sep. 24, 2009 (6 pages), Sep. 24, 2009.
"Communication (Search Report under Section 17 along with Examination Report under Section 18(3)) dated Oct. 6, 2008 issued by the United Kingdom Intellectual Property Office", in counterpart U.K. Application No. EP 08101394.8-1238, Oct. 6, 2008.
"Communication Pursuant to Article 94(3) EPC (European Examination Report) dated Oct. 23, 2008", issued in counterpart European Patent Application No. EP 08101394.8-1238, Oct. 23, 2008.
"Examination Report", for counterpart European Patent Applicaiton No. 08153257.4 issued Jun. 2, 2009.
"Examination Report dated Nov. 9, 2009", for European Patent Application No. EP 08159355.0, Sep. 11, 2009.
"Examination Report dated Jun. 17, 2009", issued in counterpart U.K. Application No. GB 0803273.2 by U.K. Intellectual Property Office (4 pages).
"International Preliminary Report on Patentability and Written Opinion issued Nov. 24, 2009", in International Application PCT/EP 2008/056342 (7 pages), Nov. 24, 2009.
"International Search Report", for International Application No. PCT/FI2006/050455, dated Jul. 25, 2007.
"International Search Report and Written Opinion mailed on Aug. 26, 2011", for PCT/US 2011/034927 titled "Content Delivery Based on User Terminal Events," to Apple Inc., Aug. 26, 2011.
"International Search Report and Written Opinion of the International Search Authority mailed Jun. 19, 2009", for International Application No. PCT/EP 2008/056069, Jun. 19, 2009.
"International Search Report and Written Opinion of the International Searching Authority mailed Feb. 11, 2009, issued by the International Searching Authority", in related International Application PCT/EP 2008/063839 (11 pages).
"International Search Report mailed Mar. 24, 2009", in related PCT International Application No. PCT/EP 2008/063326 (4 pages). Mar. 24, 2009.
"Notice of Allowance dated Apr. 29, 2011", U.S. Appl. No. 11/888,680, 13 pages, Apr. 29, 2011.
"Office Action dated Mar. 31, 2011 issue by the U.S. Patent Office", in related U.S. Appl. No. 12/080,124 (29 pages), Mar. 31, 2011.
"Office Action issued from the USPTO dated Aug. 20, 2009", issued in related U.S. Appl. No. 12/075,593 (14 pages), Aug. 20, 2009.
"Office Action issued Mar. 17, 2010", in related U.S. Appl. No. 12/075,593 (11 pages), Mar. 17, 2010.
"Office Action Issued Oct. 15, 2010 by the U.S. Patent Office", in related U.S. Appl. No. 12/080,124 (28 pages), Oct. 15, 2010.
"Search Report under Section 17 dated Jul. 7, 2008", in related U.K. Application GB 0803273.2.
"U.K. Search Report under Section 17 dated Oct. 23, 2007", in U.K. Application No. 0712280.7, Oct. 23, 2007.
"Written Opinion of the International Searching Authority mailed Mar. 24, 2009 issued from the International Searching Authority", in related PCT International Application No. PCT/EP 2008/063326 (5 pages), Mar. 24, 2009.
"XP00245625—Statement in Accordance with the Notice from the European Patent Office dated Oct. 1, 2007", concerning business methods (OJ Nov. 2007; p. 592-593), Nov. 1, 2007.
Ghose, Anindya et al., "An Empirical Analysis of Search Engine Advertising: Sponsored Search in Electronic Markets", Management Science, Informs, 2009.
Karuga, Gilber G. et al., "AdPalette: An Algorithm for Customizing Online Advertisements on the Fly", Decision Support Systems, vol. 32, 2001.
Mueller, Milton, "Telecommunication Access in Age of Electronic Commerce: Toward a Third-Generation Service Policy", Nov. 1996, HeinOnline, 49. Fed. Comm L.J., Nov. 1, 1996, 655-665.
Perkins, Ed, "When to buy airfare", http://www.smartertrael.com/travel-advice/when-to-buy-airfare.html?id=1628038, Nov. 21, 2006 (4 pages).
Science Dictionary, , Definition of "dynamic", 2002.
World English Dictionary, , Definition of "relevant", 1998.

* cited by examiner

SELECTION AND DELIVERY OF INVITATIONAL CONTENT BASED ON PREDICTION OF USER INTENT

FIELD

The following relates to delivery of invitational content and more specifically relates to systems and methods for selecting and delivering invitational content by predicting user intent.

BACKGROUND

Computer applications, websites, or other electronic content including offers for products and services generally require a user to explicitly select and/or interact with one or more portions of the content being presented to generate a conversion (e.g., completion of a sale or purchase, submission of information to a content provider, causing delivery of additional information to the user or any other pre-defined response for the content). For example, an advertisement for a product or service can require the user to select the advertisement and navigate to the online store offering the product for sale. At the online store, the user can then enter information to purchase or obtain additional information regarding the product or service.

In many types of electronic content maintained by content providers, the portions of the content offering products and services are generally not static. Rather, such (primary) content providers may offer such portions, directly or via an agent, for use by one or more other (secondary) content providers. Thus, the content in these portions will typically vary over time, depending on the arrangement between the primary and secondary content providers. Additionally, the number of primary content providers, the number of secondary content providers, the number of users accessing content, and the number of available portions of the content maintained by the primary content providers available to secondary content providers can also all vary over time. As a result, primary content providers (or their agent) are generally faced with a non-trivial task of managing sale and use of these content portions for secondary content providers.

SUMMARY

Accordingly, the present technology concerns systems and methods for managing electronic content from multiple content providers. More specifically, the present technology provides systems and methods for delivering invitational content based on a prediction of the intent of a user with respect to various types of invitational content. In particular, systems and methods are provided for identifying one or more partial action sequences associated with a user based on a journal of events associated with the user. Thereafter, the partial sequences are analyzed and scored based on their degree of proximity to completion. Based on this scoring, a queue of invitational content can then be generated.

In operation, a request for a content package is received from a user terminal associated with a user. Responsive to this request, the content delivery system obtains and analyzes a journal of events associated with the user. In particular, the journal is analyzed to detect any occurrences of portions of any pre-defined response sequences associated with different user modes. Thereafter, proximity scores are computed for of the different user modes associated with the detected sequences, where a proximity score indicates the proximity of the detected portion to completion of the corresponding pre-defined sequence, i.e., a degree of user intent. Once the scores are computed, a queue of invitational content can be assembled, where the order and type of invitational content can be selected based on the scores.

In some configurations, a queue can be assembled for the user to provide for future delivery of invitational content. In particular, once the journal is obtained and the portions of the pre-defined sequences are identified, the journal and the pre-defined sequences can be used to project a future time interval at which the identified sequence portions will be completed. Accordingly, the queue can be configured to provide appropriate invitational content at that future time interval.

DESCRIPTION

Various embodiments of the disclosed methods and arrangements are discussed in detail below. While specific implementations are discussed, it should be understood that this is done for illustration purposes only. A person skilled in the relevant art will recognize that other components, configurations, and steps may be used without parting from the spirit and scope of the disclosure.

Figure 1:
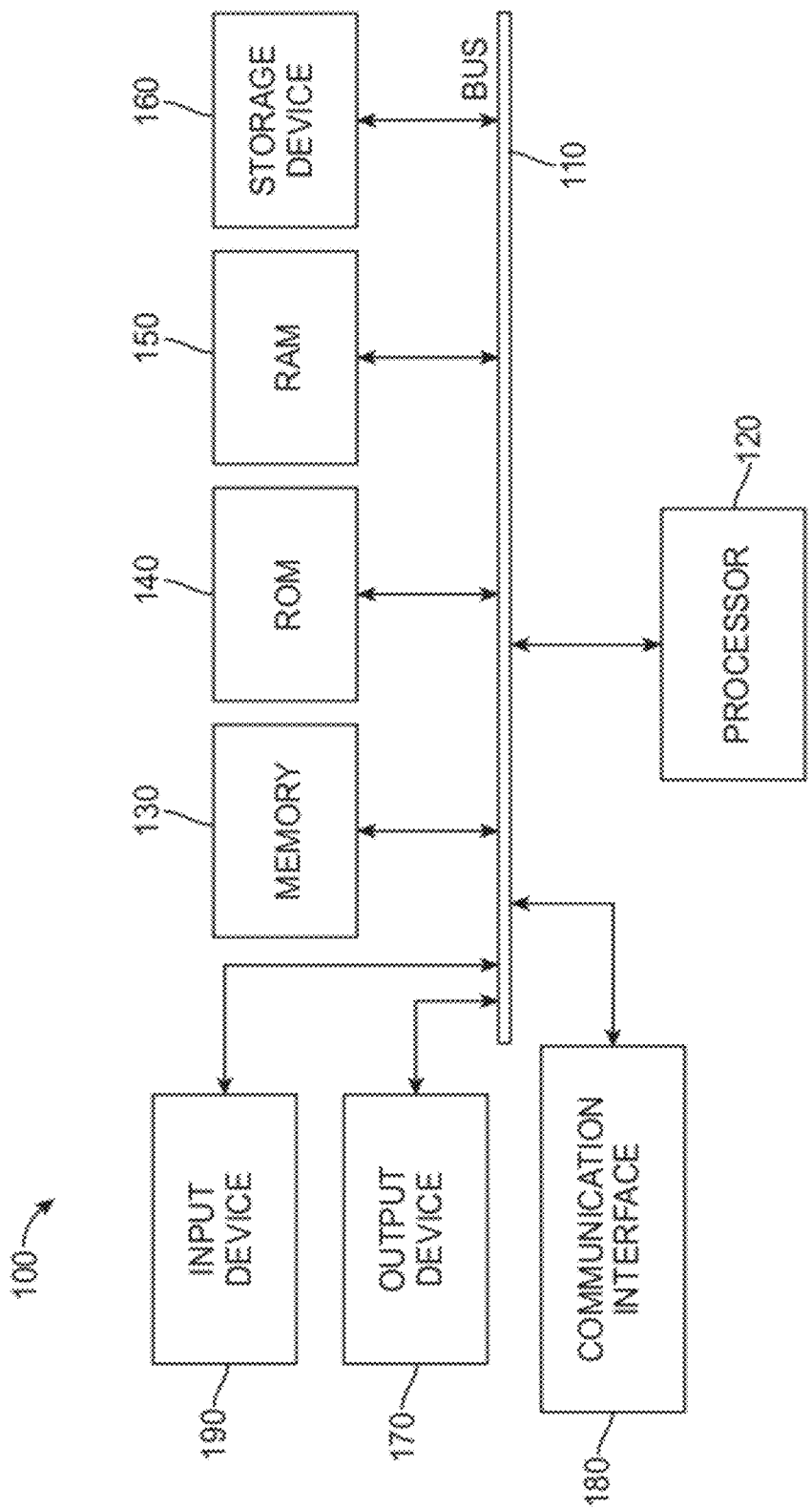
FIG. 1 illustrates an example computing device.

With reference to FIG. 1, a general-purpose computing device 100 which can be portable or stationary is shown, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the system may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a large computer server.

Although the exemplary environment described herein employs a hard disk, it should be appreciated by those skilled in the art that other types of computer readable media which can store data that is accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. For example, video output or audio output devices which can be connected to or can include displays or speakers are common. Additionally, the video output and audio output devices can also include specialized processors for enhanced performance of these specialized functions. In some instances, multimodal systems enable a user to provide multiple types of input to communicate with the computing device 100. The communications interface 180 generally governs and manages the user input and system output. There is no restriction on the disclosed methods and devices operating on any particular hardware arrangement and therefore the basic features may easily be substituted for improved hardware or firmware arrangements as they are developed. For clarity of explanation, the illustrative system embodiment is presented as including individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) for storing software performing the operations discussed below, and random access memory (RAM) for storing results. Very large scale integration (VLSI), field-programmable gate array (FPGA), and application specific integrated circuit (ASIC) hardware embodiments may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
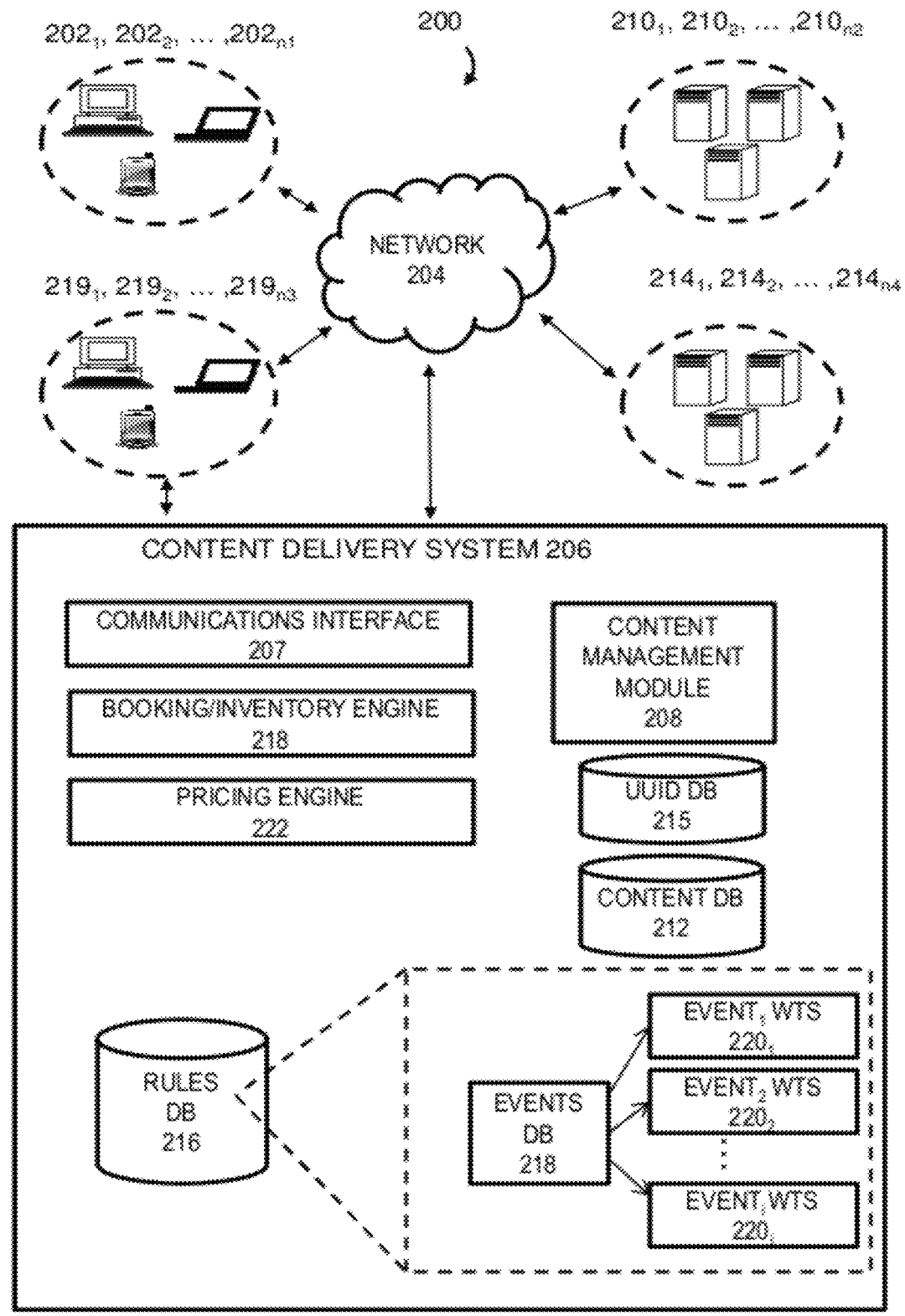
FIG. 2 illustrates an example system embodiment.

The present system and method is particularly useful for managing an inventory of atoms from one or more primary content providers for use by multiple content providers. A system 200 is illustrated in FIG. 2 wherein electronic devices communicate via a network for purposes of exchanging content and other data. In some embodiments, the present system and method are carried out on a local area network such as that illustrated in FIG. 2. However, the present principles are applicable to a wide variety of network configurations that facilitate the intercommunication of electronic devices.

In system 100, invitational content is delivered to user terminals $102_1 \ldots 102_n$ (collectively "102") connected to a network 104 by direct and/or indirect communications with a content delivery system 106. In particular, the content delivery system 106 receives a request for a content package of electronic-invitational content, such as a web page, an application, a game, or media, etc., from one of user terminals 102. In the various embodiments, one or more types of invitational content can be combined in a content package. The invitational content can include text, graphics, audio, video, executable code or any combination thereof. In some embodiments, the invitational content can be associated with a product or can directly or indirectly advertise a product. In some embodiments, the content package can be configured to replace or update invitational content in a content package already delivered to the user terminal.

Further, the invitational content can be active invitational content. That is, invitational content that is designed to primarily elicit a pre-defined response from the user. For example, active invitational content can include one or more types of advertisements configured to be clicked upon, solicit information, or be converted by the user into a further action, such as a purchase or download of the advertised item. However, invitational content can also include passive invitational content. That is, invitational content that is designed to primarily inform the user. In some cases, passive invitational content can include information that can lead or direct users to active invitational content. Additionally, the invitational content can be dynamic invitational content. That is, invitational content that varies over time or that varies based on user interaction with the invitational content. However, the various embodiments are not limited in this regard and the invitational content can be static invitational content that does not vary over time or that varies based on user interaction. In the various embodiments, an invitational content in a content package can be static or dynamic and active or passive. Further, various types of invitational content can be combined in a same content package.

After receiving the request for invitational content, the content delivery system 106 selects the invitational content in response to the request and transmits the assembled invitational content to the requesting one of user terminals 102. In some embodiments, the server has preselected the invitational content before the request is received. Thereafter, the server assembles a content package of invitational content and causes the content package to be delivered to the user. The content delivery system can include a communications interface 107 to facilitate communications with the user terminals 102 and any other components familiar to those of ordinary skill in the art.

The content delivery system 206 includes a content management module 208 that facilitates generation of the assembled content package that includes time-varying content, such as an advertisement. Specifically, the content management module can combine content from one or more primary content providers $210_1 \ldots 210_{n2}$ (collectively "210") and content from one or more secondary content providers $214_1 \ldots 214_{n3}$ (collectively "214") to generate the assembled content package for the user terminals 202. For example, in the case of a web page being delivered to a requesting one of user terminals 202, the content management module 208 can assemble a content package by requesting the data for the web page from one of the primary content providers 210 maintaining the web page. For the time varying content on the web page provided by the secondary content providers 214, the content management module 208 can request the appropriate data according to the arrangement between the primary and secondary content providers 210 and 214.

Although, primary and secondary providers 210, 214 are presented herein as separate entities, this is for illustrative purposes only. In some cases, the primary and secondary providers 210, 214 can be the same entity. Thus, a single entity may define and provide both the static and the time-varying content.

In some embodiments, the content management module 208 can be configured to request that the data be sent directly from content providers 210 and 214. In other embodiments a cached arrangement can also be used to improve performance of the content delivery system 206 and improve overall user experience. That is, the content delivery system 206 can include a content database 212 for locally storing or caching content maintained by content providers 210 and 214. The data in the content database 212 can be refreshed or updated on a regular basis to ensure that the content in the database 212 is up to date at the time of a request from a user terminal. However, in some cases, the content management module 208 can be configured to retrieve data directly from content providers 210 and 214 if the metadata associated with the data in content database 212 appears to be outdated or corrupted.

In the various embodiments, the one or more databases described herein can be implemented using any type of data structures. Such data structures include, but are not limited to data structures for relational databases, key/value stores, graph databases, hierarchical databases, and distributed or columnar stores. Accordingly, although the various embodiments described herein may refer to specific data structures in some embodiments, in other embodiments such data structures can be substituted for any other type of database structure.

In the various embodiments, the content delivery 206 can also include a unique user identifier (UUID) database 215 that can be used for managing sessions with the various user terminal devices 202. The UUID database 215 can be used with a variety of session management techniques. For example, the content delivery system 206 can implement an HTTP cookie or other conventional session management methods (e.g., IP address tracking, URL query strings, hidden form fields, window name tracking, authentication methods, and local shared objects) for user terminals 202 connected to content delivery system 206 via a substantially persistent network session. However, other methods can be used as well. For example, in the case of mobile devices or other types of user terminals connecting using multiple or non-persistent network sessions, multiple requests for content from such devices may be assigned to a same entry in the UUID database 215. Such an assignment can be provided by analyzing requesting device attributes in order to determine whether such requests can be attribute to a same device. Such attributes can include device or group-specific attributes.

As described above, one aspect of the present technology is the gathering and use of data available from various sources to improve the delivery of advertisements or any other content that may be of interest to users. The present disclosure contemplates that in some instances, this gathered data may include personal information data that uniquely identifies or can be used to contact or locate a specific person. Such personal information data can include demographic data, location-based data, telephone numbers, email addresses, social network identifiers, home addresses, or any other identifying information.

The present disclosure recognizes that the use of such personal information data in the present technology can be used to the benefit of users. For example, the personal information data can be used to better understand user behavior, facilitate and measure the effectiveness of advertisements, applications, and delivered content. Accordingly, use of such personal information data enables calculated control of the delivered content. For example, the system can reduce the number of times a user receives a given ad or other content and can thereby select and deliver content that is more meaningful to users. Such changes in system behavior improve the user experience. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for advertisement delivery services. In yet another example, users can configure their devices or user terminals to prevent storage or use of cookies and other objects from which personal information data can be discerned. The present disclosure also contemplates that other methods or technologies may exist for blocking access to their personal information data.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

As described above, content maintained by the content providers 210 and 214 can be combined according a predefined arrangement between the two content providers, which can be embodied as a set of rules. In an arrangement where the content delivery system assembles the content package from multiple content providers, these rules can be stored in a rules database 216 in content delivery system 206 and content management module 208 can be configured to assemble the content package for user terminals 202 based on these rules. The rules can specify how to select content from secondary content providers 214 and the primary content providers 210 in response to a request from one of user terminals 202. For example, in the case of a web page maintained by one of primary providers 210 and including variable advertisement portions, the rules database 216 can specify rules for selecting one of the secondary providers 214. The rules can also specify how to select specific content from the selected one of secondary providers 214 to be combined with the content provided by one of primary providers 210. Once assembled, the assembled content package can be sent to a requesting one of user terminals. However, the content package is not limited to the content from content providers 210 and 214. Rather, the content package can include other data generated at the content delivery system 206.

Although various rules can be setup to ensure that content from secondary content providers 214 is delivered to the user terminals 202, a concern for the entities associated with the secondary content providers 214, such as advertisers, is whether the delivered invitational content will actually result in a conversion or other desired response at the user terminals 202. That is, advertisers and similar entities are generally concerned in ensuring that that their invitational content reaches the audience that is most likely to provide the desired response. Unfortunately, such entities generally have little control with respect to the actual selection of users that will receive their invitational content.

Typically, entities booking or assembling electronic campaigns can specify that their invitational content should be delivered to users associated with one or more characteristics (e.g., device type, demographics). However, such entities have little or no control over which specific users will receive their invitational content and/or at which exact time their invitational content will be delivered to the users. As a result, the conventional rules for a content delivery system may allow invitational content to be delivered to users who have little or no interest in providing the desired response. Further, these rules may also allow invitational content to be delivered to users who may be interested in the invitational content but will fail to provide the desired response due to timing. That is, delivery of the invitational content may not coincide with the user having sufficient interest in invitational content to provide the response. For example, invitational content related to a purchase of a product may be delivered while the user is still in early stages of researching the product. In another example, the invitational content may be delivered to a user who is only slightly or peripherally interested in the product. Worse yet, the invitational content may be delivered at a time after the interest of the user in the product has waned. Thus, a portion of an entity's budget may be unnecessarily going towards delivery of invitational content to users for which there is little or no prospect of a conversion.

In view of the foregoing, the various embodiments provide systems and methods for improving delivery of invitational content to users. In particular, the various embodiments provide systems and methods for the delivery of invitational content based on inferring or predicting a current interest and/or a current intent of the user. The content delivery system can then use this inference or prediction to select and deliver invitational content that is more likely to result in a conversion than invitational content selected based on conventional rules in a content delivery system. For example, based on the current interest or intent of the user, the queue of invitational content generated by the content delivery system can be reordered for a user according to the user's current interest or intent. In another example, the relevant invitational content for the user can be extracted from the queue, using the current interest or intent to search for the relevant invitational content. As a result, the various embodiments result in systems and methods in which the invitational content that is delivered to users will generally be of greater interest to the users. Accordingly, such a delivery method results in a greater likelihood that the subsequent user interactions will result in a conversion or other desired response.

As described above, one aspect of the present technology is inferring or predicting the intent of the user and thereafter delivering invitational content. In particular, delivering invitational content that coincides with the current intent of the user. This process is described below with respect to FIG. 3.

Figure 3:
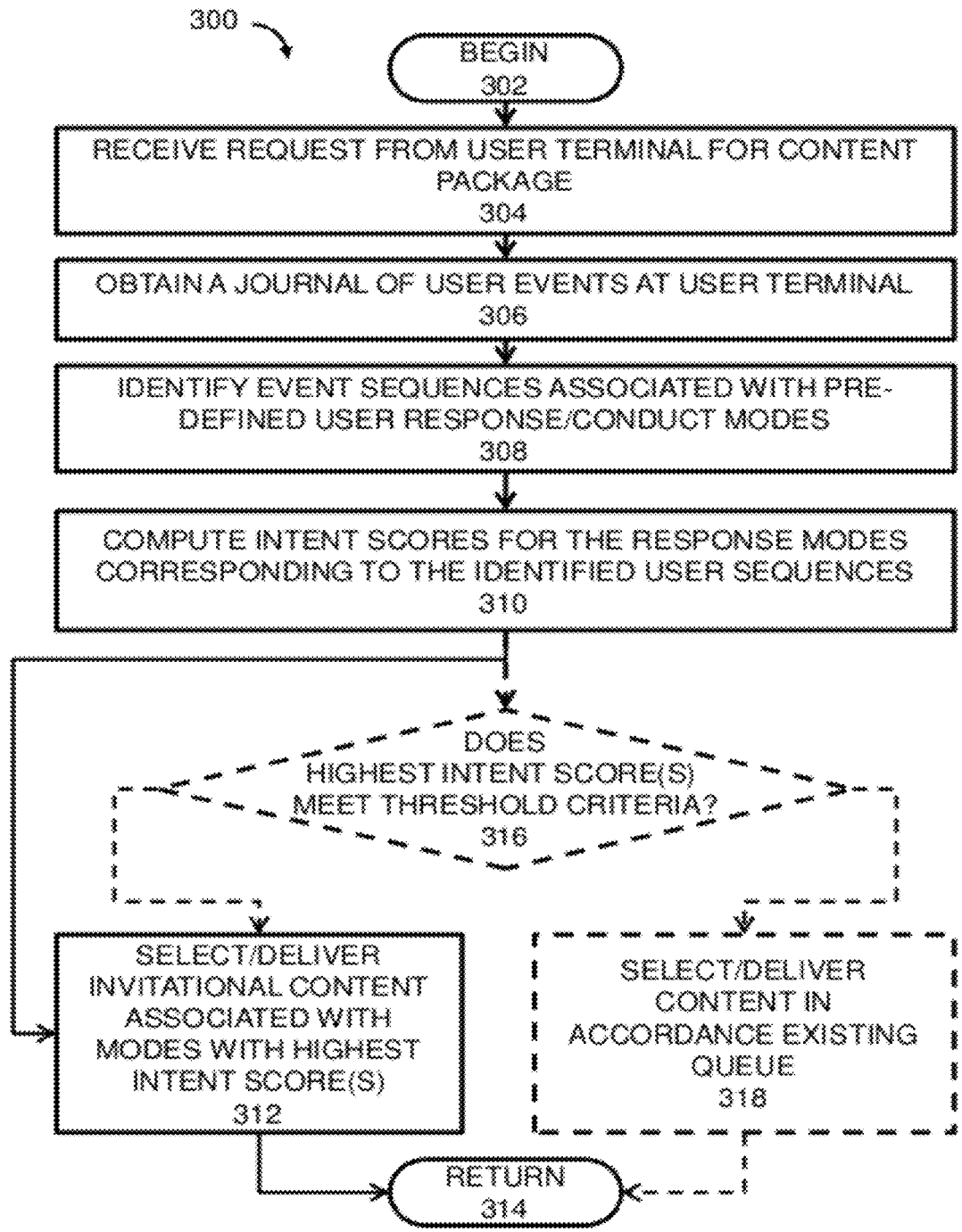
FIG. 3 is a flowchart of steps in an exemplary method for selecting and/or delivering invitational content to a user based on a prediction or projection of the user's current intent.

FIG. 3 is a flowchart of steps in an exemplary method 300 for selecting and/or delivering invitational content to a user based on a prediction or projection of the user's current intent. That is, predicting which actions the user is likely to take, based on historical data for the user, and selecting invitational content for the user based on such predictions.

Method 300 begins at step 302 and continues on to step 304. At step 304, a request for a content package is received from a user terminal associated with a user, as described above with respect to FIG. 2. Thereafter, at step 306, a journal of user events associated with the user is obtained by the content delivery system. For example, a journal of user events associated with a user at the user terminal requesting delivery of a content package.

Although the various embodiments will be described herein with respect to a journal of events at a single user terminal, this is solely for illustrative purposes. The present technology contemplates that a journal of user events can be generated based on user actions at multiple user terminals. For example, the journal can include user actions occurring on a user's mobile device, workplace computer, and home computer. Further, the present technology also contemplates that a journal can be assembled from events occurring during different sessions on the same user terminal or different user terminals. Such configurations can be used to provide additional information to more accurately determine an intent or interest of the user.

In the various embodiments, the journal of user events can be obtained in a variety of ways. For example, as described above, the content packages are not limited to the content from content providers 210 and 214. Thus, other data in the content packages can include code or instructions for the user terminal to generate a journal or log of events occurring at the requesting one of user terminals after receipt of a content package from the content delivery system. For example, the assembled content package can be delivered along with a server-side generated cookie or a server-side generated daemon or other application that generates the journal and delivers the journal back to the content delivery system 206. In another example, the assembled content package can be delivered with instructions for generating a terminal-side cookie or spawning an instance of a terminal-side daemon or other application for generating the journal and delivering the journal back to the content delivery system 206. In some cases the code or instructions can be embedded within delivered portion of the content in the content package. In yet other embodiments, the user terminals 202 can be configured to automatically being generating the journal upon receipt of a content package from the content delivery system 206 or in response to the occurrence of specific user/device interactions.

Although generation of the journal can be triggered at the time of delivery and presentation of the content from the delivered content package, in other embodiments the journal generation can be triggered by other events. For example, in some embodiments the journal generation can be triggered at the time of the request at the user terminal 202 or upon request or delivery of the advertisement second content package to the user terminal. In other embodiments, the journal generation can be triggered based on detection of explicit user input (e.g., as in when the user asks the user terminal to track his current location). Thus, by allowing the generation of the journal to begin prior to presentation of the content from the delivered content package, other data associated with the user terminal can be captured and used to subsequently infer the intent of the user. For example, load times and other delays can be used to positively or negatively affect subsequently computed scores, as described below.

As described above, the journal can record the occurrence of events. In particular, the journal records the occurrence of events with respect to one or more types of content or content from one or more of content providers 210 and 214. Such events can include, for example, actions at a user interface device, such as a keyboard or keypad, a mouse or trackball, a touchpad or touch screen, or any other type of user input device, for permitting a user to directly interact with content presented at user terminal. In some cases, the occurrence of particular sequence of events, such as a series of sustained or multiple user actions, can be recorded in the journal as a single event.

Additionally, such events can also include recording of requests for content packages, including the type of content requested, any additional information submitted as part of the request, the source of the requested content, and any other information that provides identification and/or categorization, with respect to content, for the request.

For each of these events, the journal can include timestamp information, such as the date, time, and length of the event. Further, the events in the journal can also include user terminal generated events, such as notifications for the user, generation of error messages, or any other type of activity not corresponding to a direct user input. Further, the journal can also record periods of inactivity as events in the journal.

Once the journal is obtained at step 306, method 300 can proceed to step 308. At step 308, the journal can be analyzed to identify the occurrence of portions of one or more pre-defined event sequences, such as event sequences associated with particular user responses or behavior modes. In some embodiments, these pre-defined event sequences can be selected to be event sequences that typically or predominantly result in a conversion or some other desirable response. Such event sequences can be defined in a variety of ways. For example, there may be a specific set of events that is required to result in a conversion. In another example, the set of events for the pre-defined event sequences can be determined by evaluating the events associated with a group of users. Thereafter, the sequences from the users that result in desired types of responses can then be used to define the pre-defined event sequences. However, the various embodiments are not limited in this regard and any other methods for generating and identifying such sequences can also be used without limitation.

The identification at step 308 is conceptually described below. First, let pre-defined sequences of user events ACEHL, BDGMP, and EFNRS represent sequences of events (an event is represented by each letter) that result in conversions. Second, let the user journal received at step 306 show that the sequence of events ABCDEFGHI has occurred at a user terminal. Thus, at step 308, a journal containing such a sequence would result in identification of partial sequences ACEH, BDG, and EF for pre-defined sequences ACEHL, BDGMP, and EFNRS, respectively.

Once the partial sequences are identified at step 308, intent scores can be computed at step 310 for each of the response modes corresponding to the identified partial sequences. In the various embodiments, this intent score indicates a proximity of an identified sequence to the completion of a corresponding pre-defined sequence. In other words, a likelihood that a user in a mode has the intent to complete the sequence, including providing the pre-defined response associated with the pre-defined sequences. For example, referring to scenario above, the identified sequence ACEH would likely be associated with a higher intent score than identified sequences BDG and EF, since the sequence ACEH is closer to completion. Further details on the calculation of intent scores will be described below in greater detail with respect to FIG. 4. Once the intent scores are calculated at step 310, the method 300 can proceed to step 312. At step 312, invitational content for a next content package can then be selected and/or delivered according to the highest intent scores computed at step 310. Method 300 can then end at step 314 and resume previous processing, including repeating method 300.

The intent score can be used in several ways to assemble the next content package. For example, as described above, the intent scores can be used to define a user-specific queue. In some configurations, the user-specific queue can be generated by reordering the conventional queue in the content delivery system. For example, the invitational content can be ordered such that the invitational content associated with sequences having higher intent scores is at the top of queue. In other configurations, the intent scores can simply be used to directly select invitational content from the queue. That is, since the highest intent scores are associated with one or more types of content, invitational content for the content package can be extracted from the queue that corresponds to this type of content. Thus, the queue can be ordered or invitational content can be selected such that the next content package for the user terminal includes invitational content related to the completed sequence, specifically invitational content to induce the user to complete the pre-defined sequence. In some configurations, a different content, closely related to the completed sequence can be selected, alternatively or in addition to, the invitational content related to the completed sequence. For example, such content can include content associated with a same electronic campaign, a same provider, or similar goods and services.

In some embodiments, the identification associated with step 308 can be limited to a specific window of time, such as a recent or current window of time. Thus, only sequences associated with recent events would be considered. As a result, the intent scores computed at step 310 would then only be computed for sequences that are associated with the current activities of the user. In some configurations, the identification at step 308 can be limited to identify sequences that begin within the selected time window. Such a configuration results in consideration of sequences that were begun by a user during a recent timeframe. In other configurations, the identification at step 308 can be limited to identify sequences that have some events within the selected time window. Such a configuration not only allows capture of sequences associated with a current time frame, but also sequences carrying into the current time frame. In yet other configurations, the identification at step 308 can be limited to identify sequences with some minimum amount of activity during the selected time window. Any combinations of these methods can also be used. Further, the sequences to be considered can also be limited in any other way. Thus, using one or more of the methods above, sequences with little or no significant amount of associated activity are not selected at step 312.

In some cases, it is possible that the highest intent score may be too low to warrant reorganization of the queue. For example, the partial sequence associated with the highest intent score may represent only a few events of the entire partial sequence. As a result, this "highest" intent score may not truly represent the intent of the user to complete the sequence. Therefore, delivery of associated invitational content may be premature. Accordingly, in some embodiments, the intent scores can be compared to a threshold value or other score criteria. Thus, if an intent score exceeds or meets this threshold criteria at step 316, method 300 can proceed to step 312, as the intent score is indicative that the events in the identified sequence are close to occurrence of a conversion associated with the completed sequence. However, if the threshold criteria are not met at step 316, method 300 can proceed instead to step 318. At step 318, invitational content can be selected from the conventional or existing queue, as the intent scores do not yet indicate that the user intends to provide a pre-defined response or intends to complete any of the pre-defined sequences. Method 300 can then proceed to step 314 to resume previous processing, as described above.

In some embodiments, more than one threshold value or score criteria can be specified. For example, at least first and second threshold values can be provided to indicate different levels or degrees of intent. In such an arrangement, when an intent score exceeds the highest threshold values, this can indicate a high degree of intent to complete the pre-defined sequence or that the sequence has been substantially completed. Thus, invitational content associated with the pre-defined response can be selected, as the user is predicted to be ready to provide the pre-defined response. Additionally, depending on the proximity of the identified sequence to the completed sequence, invitational content offering a discount, a coupon, or some other inducement, can be selected to induce the user to complete the sequence. In contrast, if the proximity score exceeds only the second threshold value, this can indicate a lower degree of intent to complete the pre-defined sequence. Thus, the invitational content can be selected to induce the user to continue proceeding in the sequence. For example, the type of invitational content can also be tailored based on the degree of intent. For example, in the case of users associated with lower intent scores, the invitational content can be selected that is designed to induce users to learn more about a product, instead of selecting invitational content designed to request users complete a purchase of the product. Although only two threshold values are described above, other threshold values can be specified and any associated criteria for selecting invitational content can be specified.

Figure 4:
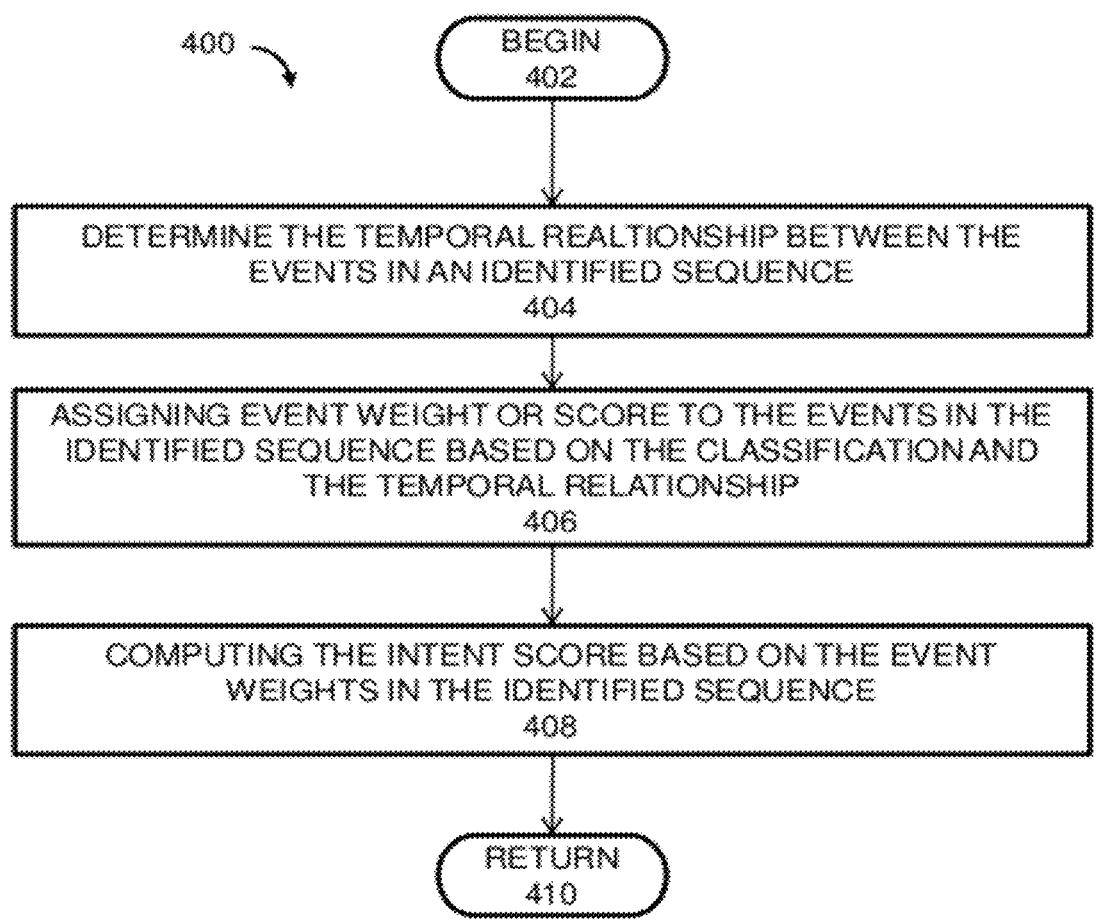
FIG. 4 is a flowchart of steps in an exemplary method for computing intent scores.

Referring now to FIG. 4, there is provided a flowchart illustrating a method 400 for determining intent scores. Method 400 begins at step 402 and continues to step 404. At step 404, the temporal relationship between the events in an identified sequence in the journal can be determined. For example, a relative timing of the events in the identified sequence can be determined. Further, a number of recurrences of an event in the identified sequence before a next event in the identified sequence can be determined. Any other aspects of the temporal relationship between the events in the identified sequences can also be determined at step 404.

Once the temporal relationship(s) between the events in the identified sequence is determined at step 404, each of the events can be associated with an event weight or event score at step 406. That is, each event can be mapped to a particular event weight or score based on its relative temporal position in the journal. In some embodiments, the event weights can also rely, at least partially, on which events are present in the identified sequence. That is, the complete sequence may include one or more events of major significance or that are indicative of substantial forward progress of a user with respect to a completed sequence. For example, although events indicating that a user is viewing content associated with a product indicate some intent to learn more about a product or make a purchase, the occurrence of a visit to the manufacturer's website, the supplier's website, or some other identified location may indicate the user's increased interest in the product and thus intent to purchase the product. Accordingly, when such events are detected in the identified sequence, a higher event weight can be applied for these events and a lower event weight can be applied for other events.

In some embodiments, the event weights can also rely at least partially on a source of the event. In many cases, events occurring on a user terminal consist of user-initiated events, user terminal initiated events, or combinations thereof. In general, an advertisement or other electronic content seeking a response generally requires some level of direct user interaction. Therefore, an event weight can be applied accordingly. For example, a higher event weight can be applied for events primarily initiated by users, depending on the level of user interaction. In contrast, user terminal initiated events can be associated with lower event weights depending again on the level of user interaction.

As described above, an event weight can also rely on the temporal relationship between the events in the journal. Accordingly, the timing of the events can also affect the event weights. That is, even if a substantially complete sequence of events is detected in the journal, the separation in time between the events can be so great that it is unlikely that the user was intending to complete the sequence. Similarly, even if a sequence of events was detected in the journal, the inclusion of one or more additional events interposed between such events can affect event weights. For example, if such intervening events are primarily user-initiated, this can be indicative of the user not having intent to complete the sequence and thus a lower event weight should be applied. In contrast, if such events are user terminal initiated, this indicates that the user may intend to complete the sequence, but was interrupted by other, external factors. Thus, the significance of these intervening events is lower and thus a higher event weight can be applied. Additionally, the frequency of recurrence of events in a sequence can affect the event weights. For example, if an event is repeated multiple times prior to proceeding to a next event in the identified sequence, this can be indicative of the user not truly having intent to complete the sequence and thus a lower event weight should be applied.

The event weights can be generated via a mathematical function that is based on some original weights, but which then generates a function that can generate a new weight, depending on certain conditions. These conditions can include an order/sequence, type of actions, content or user metadata that provide context in which these actions have been performed. However, any other conditions can also be used to generate the new weights.

Referring back to FIG. 4, once the event weights for the events are assigned at step 406, the event weights can be aggregated or combined at step 408 to determine an intent score for the identified sequence. Such a computation can occur in a variety of ways. For example, the intent score can be a statistical measure of the event weights, such as the mean, the median, or the mode of the event weights. However, any other methods for combining or evaluating the event weights or distributions thereof can be used. Once the intent score for the journal (i.e., the score for the user terminal) is determined at step 408, the method 400 resumes previous processing at step 410. Such processing can include repeating method 400 for other journals or performing and/or complete any other methodologies and processes described herein.

In the various embodiments, the location where intent scores are calculated can vary. In some embodiments, the intent scores can be calculated at the content delivery system 206. In other embodiments, the intent scores can be calculated at the user terminals 202.

In the case of computing the intent scores at the content delivery system 206, the user terminals 202 can be enabled to transmit the journal to the content delivery system 206. The journal can be delivered to the content delivery system 206 in several ways. For example, the journal can be received as part of a data package consisting of a subsequent request for the content delivery system 206. Alternatively, the user terminals 202 can be configured to automatically generate and deliver a data package including the journal to the content delivery system 206 if a next request is being directed to different content delivery than the one providing the first content. The precise timing and format for the journal and/or the data package can be specified in the code or instruction associated with the content delivered to the user terminals 202 or can be pre-defined for the user terminals.

Upon receipt of the journals from the user terminals 202, the intent scores can be computed by content management module 208 based on the rules database 216. In particular, the rules database 216 can be configured to include an events database 218, as shown in FIG. 2, listing the various types of events that can be scored. Further, the rules database 216 can include, separately or in combination with events database 218, a set of content event weights $220_1 \ldots 220_i$ that specify the mapping for the events in events database 218 to event weights. In operation, the content management module 208 can first parse the journal to identify the events therein. Thereafter, scores can be associated these events according to the rules database 216 and the content management module 208 can generate the intent score for the journal.

In the case of computing the intent scores at the user terminals 202, the process is similar to the one described above for the content delivery system 206. Thereafter a data package, including the journal and/or the intent score, can be assembled and delivered to the content delivery system. However, in such configurations the user terminals 202 would need to locally store or having remote access to the events database 218 and the associated content event weights $220_1 \ldots 220_i$. Although such a configuration requires performing the mapping of event weights and computation of intent scores at the user terminal devices 202, such a configuration can be more desirable from a privacy standpoint. That is, since only intent scores are transmitted from the user terminals to the content delivery system, little or no information is exchanged about particular events occurring at the user terminals 202. As with delivery of the journals to the content delivery system 206, the precise timing and format for the intent scores can be specified in the code or instruction associated with the content delivered to the user terminals 202 or can be pre-defined for the user terminals.

The various embodiments described above are generally directed to determining user intent for purposes of delivering a next content package to the user. However, in other embodiments, the identified sequences can also be used to project a time at which to deliver invitational content. For example, the temporal information described above with respect to FIG. 4 can also be used to estimate a time or time interval at which the sequence is expected to be completed or substantially completed by the user. Accordingly, an invitational content queue for a user can be configured to associate specific invitational content with delivery at specific times. Thus, the content delivery system will select the invitational content based on the time interval(s) the invitational content is associated with. In some configurations, these time intervals can be updated each time a request is received from a user terminal in order to provide a more accurate association between the time intervals and invitational content. However, the various embodiments are not limited in this regard and the updating of the queue can occur with lower frequency.

As described above, the various embodiments are not limited solely to determining invitational content based on user intent. In other embodiments, the past and/or present events associated with a user can also be used to infer a degree of interest of a user with respect to one or more types of content and thus determine the appropriate content to deliver to the user. Specifically, short-term and long-term interests of the user can be determined. Thereafter, based on the long-term interests of the user or the more significant short-term interests of the user, invitation content can be selected. These processes are described in greater detail below with respect to FIG. 5.

Figure 5:
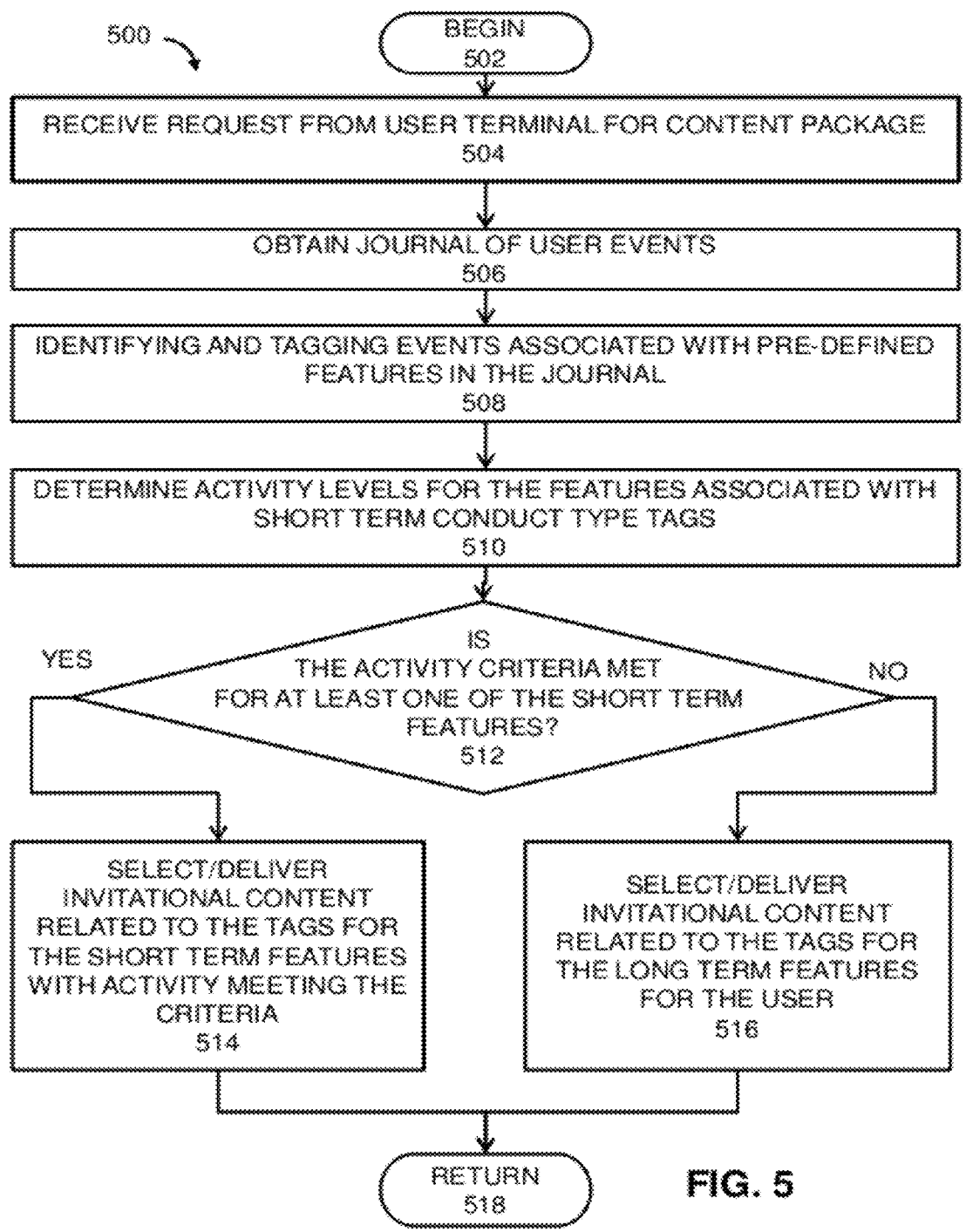
FIG. 5 is a flowchart of steps in an exemplary method for selecting and/or delivering invitational content to a user based on a user's current interest.

FIG. 5 is a flowchart of steps in an exemplary method 500 for selecting invitational content based on user interest. Method 500 begins at step 502 and continues on to step 504. At step 504, a request for a content package is received from a user at a user terminal, as described above with respect to FIGS. 2 and 3. Thereafter, at step 506, a journal of user events is obtained, where the journal is associated with the user terminal requesting the content package. This journal can be assembled and obtained in a substantially similar fashion as that described above with respect to FIGS. 3 and 4. Accordingly, the description above with respect to the journal of user events is sufficient for describing the journal of user events for FIG. 5.

Once the journal is obtained at step 506, method 500 can proceed to step 508 to identify and tag events associated with pre-defined behavior patterns in the journal of events. In particular, step 506 involves recognizing the occurrence of a sequence of events in the journal having substantially the same characteristics as the pre-defined behavior patterns and tagging such sequences of events with tags that identify the content type and associated pre-defined behavior. That is, a tag that describes the type of content associated with the events and the type of behavior associated with this content. In particular, the tags can specify whether the events in the identified sequence are associated with a long-term or a short-term pattern of behavior with respect to content. The steps for defining such pre-defined patterns described in further detail below with respect to FIG. 6.

The identification and tagging at step 508 can be performed in a variety of ways, including supervised and unsupervised techniques. For example, in a supervised technique, the pre-defined patterns (or characteristics thereof) can be used as training data for the search. Thus, the journal of events can be searched for any sequence of events therein that statistically and/or structurally match the various characteristics of any of the pre-defined patterns. The tags associated with these pre-defined sequences or patterns of behavior can then also be associated with events associated with the behavior patterns identified in the journal of events.

In an unsupervised technique, the journal of events can be first analyzed to determine its organization, i.e., to identify any patterns that are occurring in the journal. Thereafter, these identified patterns can then be compared to the pre-defined patterns. Specifically, the identified patterns in the journal can be compared to characteristics of the various pre-defined patterns to determine whether an occurrence of any of the pre-defined patterns can be detected. Such a comparison can rely on a statistical and/or structural matching of the patterns in the journal and characteristics of the pre-defined patterns. Thereafter, the tags associated with the pre-defined sequences can then be applied to the events associated with the pre-defined patterns. However, the present technology is not limited to these exemplary methods and any other pattern recognition algorithms, methods, techniques, or schemes can be used in the various embodiments. For example, these can include genetic algorithms, neural networks, Bayesian networks, and singular value decomposition, to name a few.

Once the events in the journal are tagged at step 508, invitational content can be selected beginning at step 510. At step 510, activity levels associated with one or more of the pre-defined short-term behavior patterns present in the journal are determined. For example, the journal can be analyzed to determine a frequency or an average duration of instances of an identified short-term behavior pattern associated with a selected tag. In another example, the tagging in the journal for each of the pre-defined short-term behavior patterns can be analyzed to determine a total amount of time in a selected time window associated with a selected tag. Further, the latency between each of the steps associated with a short-term behavior can be considered. However, the present technology is not limited to these exemplary methods and any other measures of the occurrence of events associated with different tags can be used in the various embodiments.

In the various embodiments, the activity levels of the tagged short-term behavior patterns in the journal can be used to infer the level of interest in content associated with corresponding tags and thereafter select appropriate invitational content. Specifically, the activity levels can be used to determine whether a user has sufficient interest in content associated with the tags for the short-term behavior patterns in the journal to warrant delivery of associated invitational content.

Generally, although a user may be currently engaged in behavior or actions that are a part of a short-term behavior pattern associated with a tag, it may not be appropriate to deliver invitational content associated with this tag. For example, consider a journal showing that a user is currently associated with a short-term behavior pattern associated with a first tag. Further, the journal shows that this pattern has not been observed before in the journal or is of a relatively short duration of time with respect to other long-term and short-term patterns associated with other, different tags. Thus, this may indicate that the user's behavior in this instance was transient and insignificant, and therefore his interest in the content associated with the tag was minimal. Accordingly, it is likely that if the user is presented with invitational content associated with this tag, the user will not provide the pre-defined response for the invitational content. Therefore, it may be more appropriate to deliver invitational content associated with a tag corresponding to the user's current long-term behavior pattern, since the user's interest in content associated with this tag is stronger.

In contrast, the journal may show that this pattern has been observed before in the journal or is of a relatively long duration of time with respect to other long-term and short-term patterns. Thus, this may indicate that the user's behavior in this instance was at least somewhat significant, and therefore his interest in the content associated with the tag was more than passing. Accordingly, if the user is presented with invitational content associated with this tag, the user may provide the pre-defined response for the invitational content. Therefore, in this case it may be more appropriate to deliver invitational content associated with the tag corresponding to the user's current short-term behavior pattern.

Accordingly, the various embodiments provide for making a determination of whether or not to consider tagged short-term interest behavior patterns during selection of invitational content for the user based on activity criteria. Thus, if short-term behavior patterns in the journal associated with a tag meet such criteria, invitational content can then be selected based on this tag. In the various embodiments, activity criteria can be specified in various ways. This will be described in further detail below with respect to FIG. 6.

Once the activity levels are determined at step 510, the activity levels can be evaluated at step 512. Thus, if an activity level associated with at least one of the short-term behavior patterns in the journal meets the corresponding activity criteria at step 512, method 500 proceeds to step 514. At step 514, invitational content is selected for the user that is associated with the tag for the identified short-term behavior pattern meeting the activity criteria. In some configurations, the selection of invitational content can include requesting the invitational content from one of secondary content providers 214. However, in other configurations, the selection can be limited to invitational content from a previously assembled queue at the content delivery system 206. That is, the queue is searched for invitational content matching the tag associated with the identified short-term behavior patterns. In the case that no such invitational content is available in the queue, invitational content selected at step 514 can instead be selected from invitational content that is associated with tags for the identified long-term behavioral patterns in the journal. Further, if no invitational content associated with tags for the identified long-term behavioral patterns is available in the queue, the invitational content can be selected according to the conventional queue.

In the case that none of the activity levels associated with the identified short-term behavior patterns observed in the journal (or during a selected time window) meets corresponding activity criteria at step 512, method 500 can instead proceed to step 516. At step 516, the invitational content is selected for the user based on at least the tags associated with the identified long-term behavior patterns in the journal (or during a selected time window). The present technology also contemplates that the existing queue of invitational content may not include invitational content associated with tags associated with identified long-term behavior patterns. Accordingly, if no invitational content associated with tags for the identified long-term behavioral patterns is available in the queue, the invitational content can be selected according to the conventional queue. Following either of steps 514 or 516, method 500 ends at step 518. At step 518, method 500 can resume previous processing, including repeating method 500.

Figure 6:
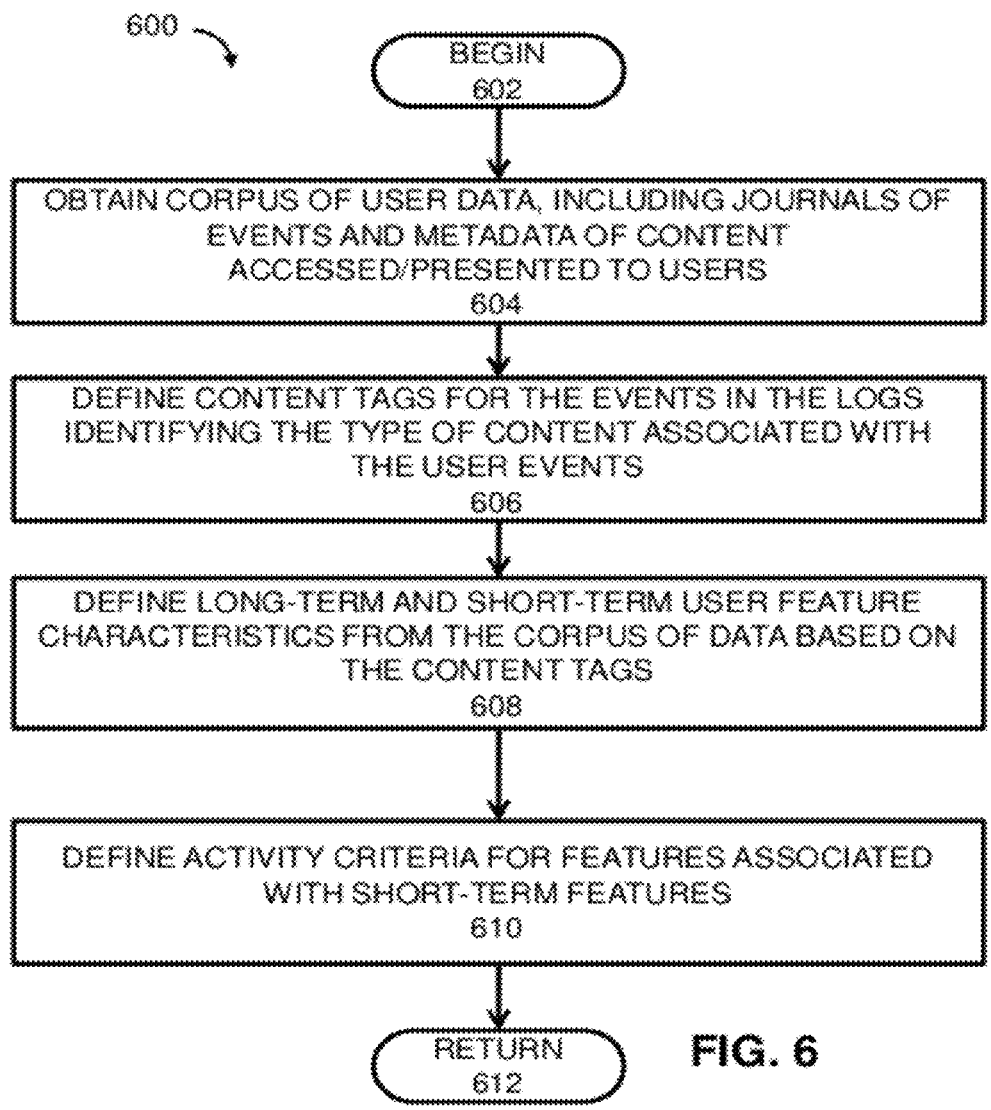
FIG. 6 is a flowchart of steps in an exemplary method for defining tags, behavior patterns, and activity criteria based on a corpus of data.

Referring now to FIG. 6, there is shown a flowchart of steps in an exemplary method 600 for defining tags, behavior patterns, and activity criteria. Method 600 begins at step 602 and proceeds to step 604. At step 604, a corpus of data is obtained. The corpus of data can include data from multiple users including, but not limited to, journals of events for the multiple users and metadata or other content information associated with the events in the journals. For example, the corpus of data can include a taxonomy of all events and history of them associated with historical presence of users at timestamps for each step, as well as metadata about the content in which particular events took place (e.g., context metadata about content, keywords, etc)

Once the corpus of data is obtained at step 604, content tags can be defined at step 606. That is, based on the metadata or other content information in the corpus of data, a set of tags that describes the content of the various events in journals is generated. Although a tag can consist of a single word, phrase, or sentence, the various embodiments are not limited in this regard. Rather, each of the tags can consist of a combination one or more words, phrases, or sentences. Accordingly, each tag can consist of a collection of sub-tags that describe one or more aspects of a content type. Thus, different tags can be provided that are associated with different, but related types of content.

In some configurations, the tags (and sub-tags) can be selected from a pre-defined set of tags or bag-of-words. The pre-defined set of tags can be fixed. However, in some cases, the pre-defined set of tags can be selected based on known information regarding the users, the content delivery system, and/or the content providers. Alternatively, the set of tags can be generated from the content information in the corpus of data. That is, the set of tags can be generated based on the content that is most prevalent in the corpus of data or based on the content in the corpus of data meeting some threshold amount of use. However, the present technology is not limited to these exemplary methods and any other tag generation methods can be used in the various embodiments.

After the tags are generated at step 606, the characteristics of patterns associated with short-term and long-term behaviors in the corpus of data associated with the various tags are determined at step 608. That is, the journals are processed to identify different patterns of behavior in the various journals that are associated with one of the content tags or a group of the content tags. Further, based on the temporal characteristics of these patterns, the patterns identified in the corpus of data are categorized into at least short-term and long-term behavior patterns. Thereafter, the common characteristics or features of these categorized patterns for each of the tags can be used to define the structural and/or statistical characteristic or features of the short-term and long-term patterns in the corpus of data associated with the content tags. Some methods for performing such pattern recognition can include singular value decomposition methods, latent semantic indexing methods, any clustering methodologies (e.g., k-means, nearest neighbors, etc), Latent Dirichlet allocation, and support vector machine methods, to name a few. However, the various embodiments are not limited to these exemplary methods and any other methods of identifying and defining patterns in a corpus of data can be used.

After content tags are defined at step 606 and the characteristics of the associated behavior patterns are defined at step 608, activity criteria can be specified for short-term behavior patterns at step 610. As described above, a minimum level of activity related to each of the short-term patterns can be defined. In some configurations, these activity levels can be defined a priori without regard to the behaviors in the corpus of data. That is, a default or pre-defined activity level can be used as the activity criteria. In other configurations, the activity levels can be defined based on the corpus of data. That is, the journals can be analyzed to determine an activity level associated with a short-term behavior pattern that resulted in a conversion, some pre-defined response to an associated invitational content, or some other event of interest. Thereafter, this activity level can be used to define the activity criteria. The method 600 can then resume previous processing at step 612.

In some embodiments, more than one activity criteria can be specified. For example, at least first and second activity criteria can be provided to indicate different levels or degrees of interest. In such an arrangement, when activity level associated with a short-term behavior pattern exceeds a highest activity criteria value, this can indicate a high degree of interest with respect to the content associated with the tag for the short-term behavior pattern. Thus, invitational content associated with the tag can be selected, as the user is predicted to be ready to provide the pre-defined response to such invitational content. In contrast, if the activity level score exceeds only the second, lower activity criteria, this can indicate a lower degree of interest with respect to the content associated with the tag for the short-term behavior pattern. Thus, different, but related invitational content can be selected. For example, the type of invitational content can also be tailored based on the degree of interest. For example, in the case of users associated with lower activity levels and thus lower interest, the invitational content can be selected that is designed to induce users to learn more about a product, instead of selecting invitational content designed to request users complete a purchase of the product. For instance, the invitational content can be configured to include an inducement for a purchase or for requesting information regarding the product. In the examples above, although only two threshold values are described above, other threshold values can be specified to indicate additional levels of interest.

Further, multiple activity criteria can be defined for each of the short-term patterns based on the occurrence and/or proximity of user behavior patterns. That is, for different combinations of long-term and short-term behavior patterns, different user responses may be observed. Such a configuration can be used to determine different degrees of interest of users based on a user's overall behavior. Thus, for each of these combinations, a different activity level can be defined that corresponds to the observed behavior for such combinations in the corpus of data.

The present technology also contemplates that alternative pricing can be provided when one or more of the targeting methods described here are utilized. That is, when invitational content is delivered based on user intent and/or interest, the delivered invitational content is effectively being delivered out of its place in the queue. As a result, the selection of invitational content based on the methods described herein can also result in the blocking or bumping of invitational content originally intended for a time interval. Accordingly, the present technology provides for the content delivery system 206 to include a pricing engine 222 for providing alternative pricing. For example, in response to delivering targeted invitational content according to the methods described, the pricing engine can increase the cost for the delivery of this invitational content. Similarly, the pricing engine can reduce the cost for the delivery of other invitational content that was bumped.

Further, the pricing engine can also be configured to provide capability for bidding prior to delivery of invitational content. That is, when bumping of invitational content or reordering of the queue is about to occur, the pricing engine 222 can also be configured to request bids from the various secondary content providers involved. Accordingly, the extent of bumping and/or reorder can be limited if secondary content providers associated with adversely affected invitational provide higher bids.

Other implementations according to these examples include computer-readable media for carrying or having computer-executable instructions or data structures stored thereon. Such computer-readable media can be any available media that can be accessed by a general purpose or special purpose computer. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions or data structures.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Communication at various stages of the described system can be performed through a local area network, a token ring network, the Internet, a corporate intranet, 802.11 series wireless signals, fiber-optic network, radio or microwave transmission, etc. Although the underlying communication technology may change, the fundamental principles described herein are still applicable.

The various embodiments described above are provided by way of illustration only and should not be construed as limiting. Those skilled in the art may recognize various modifications and changes that may be made while following the example embodiments and applications illustrated and described herein, and without departing from the true spirit and scope of the present disclosure.

The invention claimed is:

1. A computer-implemented method, comprising:
obtaining a journal of user events associated with a request from a user terminal for a content package, wherein the user terminal is associated with a user;
detecting sequences of user events in the journal, wherein each of the sequences makes up a respective portion of a predefined sequence of user events corresponding to a respective response mode;
computing an intent score for each respective response mode based on the respective portion of the predefined sequence of user events made up by each of the sequences detected, the intent score indicating a proximity of the respective portion of the predefined sequence of user events to a completion of the predefined sequence of user events that corresponds to the respective response mode; and
selecting invitational content for the content package based on the intent score of each respective response mode, wherein the invitational content selected is associated with the respective response mode having a highest intent score.

2. The method of claim 1, wherein the step of selecting further comprises assembling a queue of invitational content based on the intent score of each respective response mode, wherein the invitational content associated with the respective response mode having the highest intent score is positioned at a top of the queue.

3. The method of claim 1, wherein the step of selecting further comprises choosing invitational content associated with the respective response mode having a respective intent score meeting a threshold criteria.

4. The method of claim 1, wherein the step of selecting further comprises selecting invitational content associated with a pre-defined number of response modes having highest intent scores.

5. The method of claim 1, wherein the step of computing further comprises calculating the intent score for each respective response mode based on a temporal relationship among the user events associated with a respective sequence from the sequences of user events.

6. The method of claim 1, wherein the step of detecting further comprises:
for each of the sequences of user events, identifying user events in the journal and determining a presence, in the journal, of the respective portion of the predefined sequence of user events if the user events identified in the journal have an equivalent temporal relationship as the respective portion of the predefined sequence of user events.

7. A system comprising:
a processor; and
a computer-readable storage medium having stored thereon instructions which, when executed by the processor, cause the processor to perform operations comprising:
receiving a request for a content package from a user terminal associated with a user;
storing a journal of user events associated with the user terminal and a plurality of pre-defined response sequences associated with one or more response modes;
detecting groups of user events in the journal, wherein each group makes up a respective portion of a predefined sequence of user events associated with a respective response mode;
computing an intent score for each respective response mode based on the respective portion of the predefined sequence of user events made up by each group from the groups detected, the intent score indicating a proximity of the respective portion of the predefined sequence of user events to a completion of the predefined sequence of user events associated with the respective response mode; and
selecting invitational content for the content package based on the intent score for each respective response mode, wherein the invitational content selected is associated with a response mode having a highest intent score.

8. The system of claim 7, wherein the invitational content is selected from a queue of invitational content assembled based on the intent score for each respective response mode, wherein the invitational content associated with the response mode having the highest intent score is positioned at a top of the queue.

9. The system of claim 7, wherein the selecting step further comprises choosing the invitational content associated with the respective response mode having an intent score meeting a threshold criteria.

10. The system of claim 7, wherein the selecting step further comprises choosing the invitational content associated with a pre-defined number of response modes having highest intent scores.

11. The system of claim 7, wherein the computing step further comprises by calculating the intent score for each respective response mode based on a temporal relationship among the user events associated with a group from the group of user events.

12. The system of claim 7, wherein the detecting step further comprises detecting the groups of user events based on identifying the user events from the respective portion of the predefined sequence of user events associated with the respective response mode and determining a presence, in the journal, of the respective portion of the predefined sequence of user events if the user events identified in the journal have an equivalent temporal relationship as the user events in the respective portion of the predefined sequence of user events associated with the respective response mode.

13. A non-transitory computer-readable medium having stored therein instructions which, when executed by a processor, cause the processor to perform operations comprising:
obtaining a journal of user events associated with a request of a content package from a user terminal associated with a user;
detecting sequences of user events in the journal, wherein each sequence makes up a respective portion of a predefined sequence of user events associated with a respective response mode;
computing an intent score for each respective response mode based on the respective portion of the predefined sequence of user events made up by each sequence from the sequences of user events detected, the intent score indicating a proximity of the respective portion of the predefined sequence of user events to a completion of the predefined sequence of user events associated with the respective response mode; and
organizing a queue of invitational content for the user based on the intent score for each respective response mode, wherein the invitational content in the queue comprises invitational content associated with the sequences of user events in the journal, wherein a position of the invitational content associated with the sequences of user events in the journal in the queue is based on the intent score for each respective response mode.

14. The computer-readable medium of claim 13, wherein the step of organizing further comprises:
projecting at least one future time interval at which completion of selected ones of the sequences of user events detected will occur based on the journal; and
configuring the queue to deliver invitational content associated with the respective response mode corresponding to the selected ones of the sequences of user events at the future time interval.

15. The computer-readable medium of claim 13, wherein the step of organizing further comprises positioning the invitational content associated with the sequences of user events at a top of the queue.

16. The computer-readable medium of claim 13, wherein the step of organizing further comprises choosing invitational content associated with the respective response mode having an intent score meeting a threshold criteria.

17. The computer-readable medium of claim 13, wherein the step of organizing further comprises selecting invitational content associated with a pre-defined number of response modes having highest intent scores.

18. The computer-readable medium of claim 13, wherein the step of computing further comprises calculating the intent score for each respective response mode based on a temporal relationship among user events associated with a respective sequence of user events.

19. The computer-readable medium of claim 13, wherein the step of detecting further comprises:
for each respective response mode, identifying the user events from the sequences of user events detected in the journal and determining a presence, in the journal, of a sequence of user events that makes up the respective portion of predefined sequence of user events associated with the respective response mode if the user events in the journal have an equivalent temporal relationship as the user events in the sequence of user events.

20. A content delivery system, comprising:
a processor; and
a computer-readable storage medium having stored therein instructions which, when executed by the processor, cause the processor to perform operations comprising:
retrieving a journal of user events associated with a user terminal in response to receiving a request for a content package from the user terminal, wherein the user terminal is associated with a user;
detecting sequences of user events in the journal, wherein each of the sequences makes up a respective portion of a predefined sequence of user events associated with a respective response mode;
computing an intent score for each respective response mode, the intent score indicating a proximity of the respective portion of the predefined sequence of user events to a completion of the predefined sequence of user events associated with the respective response mode; and
assembling a queue of invitational content for the user based on the intent score of each respective response mode, wherein a position of the invitational content in the queue is based on the intent for each respective response mode.

21. The system of claim 20, wherein invitational content associated with the respective portion of the predefined sequence of user events associated with the respective response mode is positioned at a top of the queue.

22. The system of claim 20, wherein assembling the queue further comprises choosing invitational content associated with response modes having intent scores meeting a threshold criteria.

23. The system of claim 20, wherein assembling the queue further comprises selecting invitational content associated with a pre-defined number of response modes having highest intent scores.

24. The system of claim 20, wherein the computing steps further comprises computing the intent score for each respective response mode based on a temporal relationship among the user events associated with a respective sequence of user events.

25. The system of claim 20, wherein the detecting step further comprises identifying user events in the journal and determining a presence of a sequence of user events in the journal if the user events identified in the journal have an equivalent temporal relationship as the user events in the sequence of user events.

* * * * *